US 8,335,212 B2

(12) United States Patent
Hovey et al.

(10) Patent No.: US 8,335,212 B2
(45) Date of Patent: Dec. 18, 2012

(54) SYSTEM AND METHOD FOR PROVIDING LEAST-COST ROUTING OF VOICE CONNECTIONS BETWEEN HOME AND FOREIGN NETWORKS USING VOICE-OVER-IP INFRASTRUCTURE (75) Inventors: Richard Hovey, Branchburg, NJ (US); Badri Nath, Edison, NJ (US); Rakesh Kushwaha, Marlboro, NJ (US)

(73) Assignee: Mformation, Edison, NJ (US)

( * ) Notice: Subject to any disclaimer, the term of this patent is extended or adjusted under 35 U.S.C. 154(b) by 314 days.

(21) Appl. No.: 12/238,742

(22) Filed: Sep. 26, 2008

(65) Prior Publication Data

US 2010/0080128 A1 Apr. 1, 2010

(51) Int. Cl.
*H04L 12/66* (2006.01)
(52) U.S. Cl. ........................................ 370/356; 370/401
(58) Field of Classification Search .................. 370/229, 370/235, 238, 351, 389, 400, 401, 310, 345, 370/349, 352, 464, 498, 522, 356; 455/403, 455/422.1, 445
See application file for complete search history.

(56) References Cited

U.S. PATENT DOCUMENTS

| 5,901,359 A | 5/1999 | Malmstrom |
| 6,259,782 B1 | 7/2001 | Gallant |
| 6,684,072 B1 * | 1/2004 | Anvekar et al. ............ 455/432.1 |
| 6,693,894 B1 * | 2/2004 | Andersson et al. ........... 370/352 |
| 6,748,071 B2 | 6/2004 | Milton |
| 6,751,309 B2 | 6/2004 | Milton |
| 7,120,243 B2 | 10/2006 | Milton |
| 7,408,925 B1 | 8/2008 | Boyle et al. |
| 7,426,265 B2 | 9/2008 | Chen et al. |
| 2002/0177440 A1 | 11/2002 | Mukherjee |
| 2002/0197991 A1 | 12/2002 | Anvekar et al. |
| 2005/0282543 A1 | 12/2005 | Idnani et al. |

(Continued)

FOREIGN PATENT DOCUMENTS

EP 1 827 046 A1 8/2007

(Continued)

OTHER PUBLICATIONS

Fixed Mobile Convergence (FMC) Based on IMS, Siemens, V1.0, Apr. 2006.

*Primary Examiner* — Obaidul Huq
(74) *Attorney, Agent, or Firm* — Brosemer, Kolefas & Associates, LLC (57) ABSTRACT

A system and method are described for providing least-cost call routing for mobile wireless devices having access to voice-over-IP (VoIP) infrastructure, such as may be operated by an enterprise having global presence. Using a local wireless connection, such as a wireless local area network (WLAN), a software agent on the mobile wireless device registers with a common, enterprise-wide registrar, which, in turn, informs a VoIP gateway in the device's home region of the device's new location. The home region VoIP gateway will then re-route incoming calls for the device to a VoIP gateway serving the region in which the device is currently located. The local VoIP gateway will then route the call to the device via the WLAN. Seamless routing occurs even when the wireless device obtains a local phone number in a foreign network. Outgoing calls from the device can be routed via the VoIP infrastructure or the foreign network based on availability of service and/or cost.

15 Claims, 4 Drawing Sheets

U.S. PATENT DOCUMENTS

| | | | |
|---|---|---|---|
| 2005/0286466 A1* | 12/2005 | Tagg et al. | 370/329 |
| 2006/0003770 A1* | 1/2006 | Park | 455/445 |
| 2006/0079238 A1* | 4/2006 | Liu et al. | 455/445 |
| 2006/0205404 A1 | 9/2006 | Gonen et al. | |
| 2006/0205434 A1 | 9/2006 | Tom et al. | |
| 2006/0209697 A1* | 9/2006 | Fujino | 370/238 |
| 2007/0206563 A1* | 9/2007 | Silver et al. | 370/351 |
| 2008/0155476 A1* | 6/2008 | Forbes et al. | 715/835 |
| 2009/0190573 A1* | 7/2009 | Siegel et al. | 370/352 |

FOREIGN PATENT DOCUMENTS

| | | | |
|---|---|---|---|
| WO | WO 2007006118 A1 * | 1/2007 | |

\* cited by examiner

SYSTEM AND METHOD FOR PROVIDING LEAST-COST ROUTING OF VOICE CONNECTIONS BETWEEN HOME AND FOREIGN NETWORKS USING VOICE-OVER-IP INFRASTRUCTURE

FIELD OF THE INVENTION

The present invention relates to mobile wireless communications, particularly to the routing of communications for mobile wireless devices.

BACKGROUND INFORMATION

Traditional voice calls are routed over circuit-switched networks operated by service providers. A mobile device that has roaming privileges can roam into any network. 'Roaming' calls are routed from the current visiting location of the mobile device to any number in the world. However, additional fees are usually applied to calls made and/or received while the device is roaming. With the imposition of such roaming fees, the cost of calls when a wireless device is roaming is typically considerably higher than for calls when the device is in its home area. Additionally, international calling charges may also apply for calls outside of the home area of the device.

For enterprises that have presence world wide, roaming and international calling charges can add up to significant cost when employees travel to foreign regions and communicate using their home mobile devices. Most calling plans offered by service providers typically apply only to the home region or the home country of the service provider or enterprise. When mobile devices roam into other service provider networks or other countries, roaming charges and/or international calling rates apply. The costs of calls when roaming can therefore be quite substantial and are typically set at the visited carrier's discretion.

One approach to reducing the cost of roaming is to acquire a local number that applies to the region or country. This can be done by inserting a local SIM card into the device. A mobile wireless device using the local SIM card will have a number for that region and calls will be deemed as originating from that region. However, the phone number and the country code will be different and anyone wishing to call the device will have to be notified of this change. Calls to the home area number previously associated with the device will not be completed. While this approach can reduce the cost of outbound calls from within the foreign region, inbound calls to the home number of the device cannot be routed.

A second approach would be to set inbound call-forwarding features for a wireless phone prior to leaving the home network. Network-based call-forwarding services, however, are error prone, are available at the discretion of the carrier, and cannot be set once the mobile user has left their home network without customer service or alternative network configuration means, such as a customer internet service management interface or the like.

There are no other known automated means by which a roaming wireless device can obtain a local number, while calls placed to the home number of the device are re-routed to the current location or region of the wireless device.

SUMMARY OF THE INVENTION

The present invention generally relates to establishing least-cost paths for calls to and from mobile wireless devices that roam, such as in different countries or regions. An exemplary embodiment of the present invention uses a mobile wireless device which is capable of cellular and wireless local area network (WLAN) connectivity. When the device is outside of its home cellular service area, it is contemplated by the present invention that the device is assigned a telephone number that is local to the cellular service area in which it is operating so that it can make and receive calls using the local cellular network without incurring roaming charges. The device can also use its WLAN capability to connect to a nearby WLAN access point to send and receive calls using Voice-over-Internet-Protocol (VoIP).

In an aspect of the present invention, a mobile wireless device is configured with a least-cost routing (LCR) agent that facilitates the routing of VoIP calls to and from the device via WLAN. Such calls can be carried at low cost over the internet to and from remote locations without incurring roaming and long-distance calling charges. In a typical embodiment, the WLAN is coupled to a geographically distributed enterprise network interconnecting multiple premises of the enterprise. Each of the premises may be served by a WLAN which is similarly coupled to the enterprise network. Additionally, a VoIP gateway is provided in each region or premises of the enterprise to allow VoIP calls to be placed to and from the premises over the internet and aggregate VoIP traffic for efficient rules-based routing between enterprise locations, at the discretion of the enterprise, regardless of voice carrier.

In a further aspect of the present invention, a common Session Initiation Protocol (SIP) registrar is provided. The common SIP registrar, which is coupled to the enterprise network, keeps track of the locations and telephone numbers of the various mobile wireless devices of the enterprise operating in accordance with the present invention. An optimized routing rules database is maintained by the common SIP registrar to facilitate sharing optimal least-cost routes with the LCR agents of the mobile devices. Whenever a device changes telephone numbers, the LCR agent of the device reports the new number and device location to the common SIP registrar. The common SIP register, in turn, provides the VoIP gateway in the home region of the device with the new device location. Inbound calls to the original, home area number of the device are then re-routed by the home VoIP gateway (via the enterprise network) to the VoIP gateway serving the area in which the device is in currently, and ultimately, via WLAN to the device. Long-distance outbound calls from the device can be routed via WLAN as VoIP calls over the internet.

As a result, use of the present invention can eliminate roaming and/or long-distance calling charges.

Another aspect of the present invention relates to displaying to recipients of outbound calls, the 'well-known' home network phone number of a mobile wireless device, even when the device has obtained a local number in a roaming network.

Another aspect of the present invention is directed to messaging protocols for registering a mobile device with a common SIP registrar in order to facilitate the routing of VoIP calls to and from the device when outside its home area.

Yet another aspect of the present invention relates to a method by which an agent on a mobile wireless device detects a change in the phone number of the device and initiates a least-cost routing procedure by registering with the common SIP registrar. The SIP registrar then establishes a call routing path between the home VoIP gateway and the VoIP gateway currently serving the device. Calls to the home number of a mobile wireless device are routed as VoIP calls to the device while it is in a foreign network.

Yet another aspect of the present invention is directed to the dynamic configuration of wireless LAN bearer settings for accessing foreign VoIP infrastructure via wireless LAN so that VoIP calls can be routed over the enterprise network and the internet without human intervention or foreknowledge of the foreign wireless LAN or wide area wireless carrier network settings.

The above and other aspects and features of the present invention will be apparent from the drawings and detailed description which follow.

DETAILED DESCRIPTION

Figure 1:
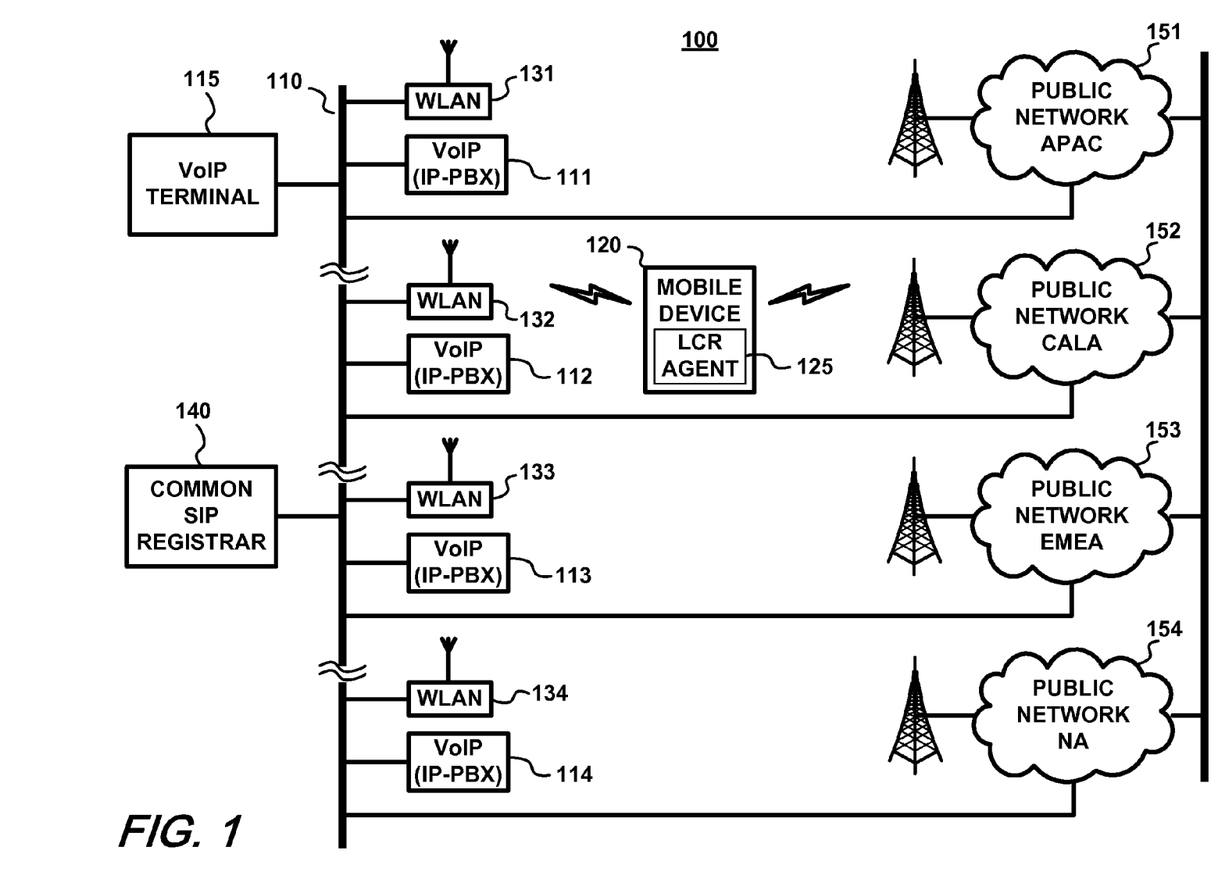
FIG. 1 is a block diagram of a system in which the present invention can be implemented, the system including a geographically distributed enterprise network with wireless LAN and Voice-over-IP connectivity within various regions served by different public networks.

FIG. 1 is a block diagram of an exemplary system 100 in which the present invention can be implemented. An enterprise network 110 that spans several regions is shown. The network 110 may be a dedicated data communications network, a virtual network, an intranet, or the like, interconnecting geographically distributed premises of an enterprise located within the various regions. For illustrative purposes, a four-region implementation is shown, e.g., Asia Pacific (APAC), Central and Latin America (CALA), Europe and Middle East (EMEA), and North America (NA), although any number of regions are contemplated by the present invention.

Within each region, the enterprise network 110 is coupled to the public communications network 151-154 for that region, i.e., the land-line, cellular and internet infrastructure servicing the region.

For voice connectivity, the enterprise uses Voice-over-IP (VoIP) and uses VoIP gateways 111-114 coupled to the network 110 for such a purpose. Although one VoIP gateway is shown in each region, there may be multiple VoIP gateways in each region. One or more VoIP terminals 115 (e.g., desktop devices) are coupled to the network 110. Each VoIP gateway 111-114 may also incorporate an IP-PBX which provides circuit-switching and other functions of a PBX (e.g., conference calling, voice mail, bridging, transfer, enhanced caller-ID, etc.) for the enterprise premises. Alternatively, the PBX function can be implemented as a separate element (not shown) coupled to the enterprise network.

Also coupled to the enterprise network 110, are wireless local-area-networks (WLAN) 131-134, typically one per each enterprise location. Although one WLAN is shown in each region, there may be multiple WLANs in each region. Preferably, the WLANs and mobile devices are implemented and operate in accordance with known standards such as IEEE 802.11, Wi-Fi, or the like, thereby allowing the use of conventional apparatus.

It is contemplated by the present invention that the enterprise will have users communicating in the regions illustrated using wireless devices such as the wireless device 120 shown in FIG. 1. The device 120 can potentially roam into any of the regions shown.

Within each region, there will typically be conventional wireless service provided over one of the public networks 151-154. Preferably, the wireless device 120 is a multi-mode device that is capable of communicating over the public networks 151-154 as well as communicating over the WLANs 131-134, although the present invention can be implemented with a device that is capable of operating only over the WLANs.

In an exemplary embodiment, the device 120 is associated with a "home" telephone number that terminates at a VoIP gateway/IP-PBX (or PBX) of the enterprise, and more specifically, the VoIP gateway/IP-PBX (111-114) of the home region of the device. If the device 120 has cellular service (in addition to enterprise WLAN connectivity), it will also have an associated cellular telephone number. As described below, it is contemplated by the present invention that the cellular telephone number of the device 120 can be changed as the device changes operating regions.

An inbound call to the device's home number is handled via the enterprise VoIP gateway/IP-PBX (111-114) in the device's home region, preferably with all of the local IP-PBX's attendant features (e.g., conference calling, voice mail, bridging, transfer, enhanced caller-ID, etc.) The VoIP gateway/IP-PBX automatically bridges the call to the mobile device 120. In other words, an inbound call to the home telephone number associated with the device 120 is 'anchored' from the home VoIP gateway/IP-PBX and 'bridged' out to the device. How this bridging is carried out will depend on where the device 120 is located and what kind of connectivity it has (i.e., WLAN and/or cellular). When the device 120 is located within its home region and it is connected to the enterprise WLAN (131-134), the inbound call is routed as a VoIP call from the home VoIP gateway/IP-PBX to the device over the WLAN. If the device 120 is in its home region but is not connected to the enterprise WLAN, the inbound call will be bridged to the cellular number, if any, associated with the device. The call can also be routed simultaneously as a VoIP call over the WLAN and as a cellular call over the cellular network. If the device 120 does not have an associated cellular number (i.e., the device does not have cellular service), the inbound call can be bridged to another number, transferred to another enterprise device, voice-mail, or the like. The home number associated with the device may be part of a "single-number" service whereby inbound calls to a single number can be routed to multiple devices that the intended recipient may use to communicate (e.g., mobile device, voicemail, work phone, home phone, etc.)

Where the device 120 has cellular service and a call is placed to the device's cellular telephone number, it may be possible, depending on the service provider, to program the device's cellular service to forward such a call to the device's "home" number, which terminates at the VoIP gateway/IP-PBX (111-114) of the home region of the device. Such call forwarding is a common feature of conventional cellular telephone service. Preferably, the VoIP gateway/IP-PBX (111-114) employs standard call routing algorithms to eliminate the potential for 'call loops' so that a call forwarded by a service provider to the VoIP gateway/IP-PBX (111-114) is not again forwarded back to the mobile number creating a looping condition. The call can then be handled as described above.

In accordance with an aspect of the present invention, to facilitate the handling of calls to and from the wireless device 120 when the device is outside of its home region, the wireless device 120 comprises a least-cost routing (LCR) agent 125. In an exemplary embodiment, the LCR agent 125 is implemented with a program (e.g., software, firmware, plug-in) running on the device 120. As described in greater detail below, the LCR agent 125 interacts with a common SIP registrar 140 coupled to the enterprise network 110. The common SIP registrar 140 would typically be owned and operated or otherwise associated with the enterprise. In addition, the LCR agent 125 is capable of detecting changes in the cellular service of the device 120 and of configuring the wireless LAN bearer of the wireless device. The LCR agent 125 can be installed and configured on the device 120 by a device management server (not shown). Preferably, the device and device management server are mutually authenticated before doing so. Alternatively, the device 120 can be pre-programmed with the LCR agent 125, such as by the manufacturer.

As contemplated in the present exemplary embodiment, when operating in a given region, the wireless device 120 is assigned a mobile telephone number that is local to that region. In other words, it is assigned a number that is associated with the public network 151-154 operating in the region. The assignment of a telephone number can be achieved by conventional means, such as the insertion in the wireless device of a Subscriber Identity Module (SIM) or SIM card associated with a regional service provider operating on the regional public network.

When the mobile telephone number of the device 120 is changed from that of its home network, such as by the insertion of a new SIM card associated with a foreign network, the LCR agent 125 detects the change. The LCR agent 125 of the device can detect the change in number and foreign carrier network ID via standard software API means. Then, as described in greater detail below, the LCR agent 125 initiates a registration procedure to enable the routing of calls to and from the device.

For outbound calls, the LCR agent 125 controls the choice of medium (e.g., whether the VoIP or cellular medium is to be used) in accordance with a rules database loaded over-the-air (OTA) from the currently registered VoIP gateway. In an exemplary embodiment, the LCR agent OTA copies a relevant segment of the routing rules for where it is currently attached and implements (chooses) the correct or least cost route based on metrics detected for the current bearer network. The rules engine thus used by the LCR 125 is dynamic, keeping up with changing tariffs and cost structures as opposed to hard coded rules in the client or VoIP server.

The LCR agent 125 senses which call mediums are available and selects which one to use based on assigned routing cost metrics so as to minimize the cost of the call. A rules engine may also apply to active calls or calls already in session where a new call medium appears or becomes available due to user mobility or external network intervention. "Soft" and "hard" hand-off scenarios when a device roams into or out of WLAN coverage and a dual-mode hand-off to or from cellular for an existing call session can be carried out in known ways. WLAN-cellular and cellular-WLAN hand-off is described, for example, by the SCCAN, UMA, and IMS-VCC standards.

In an exemplary embodiment, the LCR agent 125 also preferably carries out dynamic configuration of wireless LAN bearer settings. This allows the device 120 to access the foreign VoIP infrastructure via wireless LAN so that VoIP calls can be routed over the enterprise network and the internet without human intervention or foreknowledge of the foreign wireless LAN or wide area wireless carrier network settings. The wireless LAN settings required to set up a VoIP call can be provided to the LCR agent 125 over the enterprise network from a device management server, preferably after mutual authentication.

Figure 2:
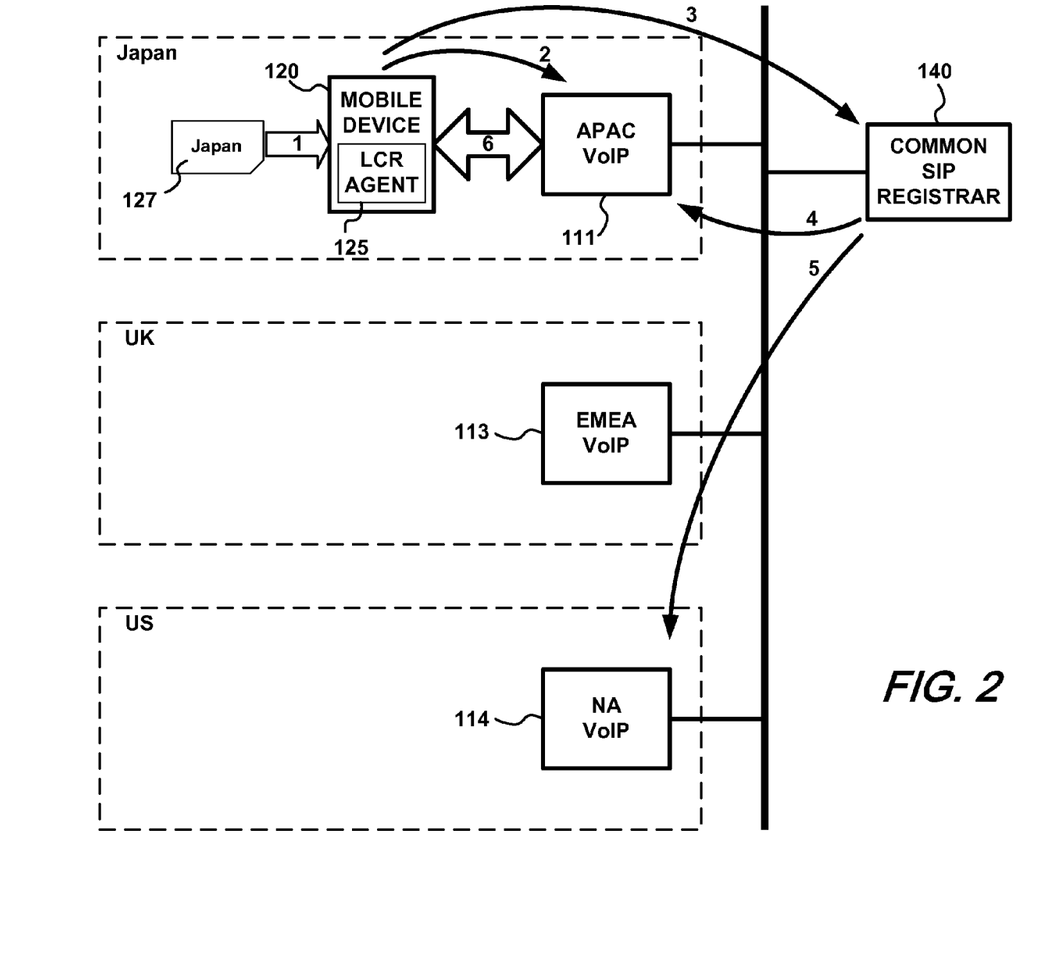
FIG. 2 is a high-level diagram illustrating the operation of an exemplary embodiment of the present invention when a mobile wireless device roams into a first foreign network from its home network.

FIG. 2 shows an illustrative scenario in accordance with an exemplary method of the present invention. In the scenario of FIG. 2, a wireless subscriber with the wireless device 120 whose wireless service home country is the United States (NA region) arrives in Japan (APAC region). As represented by arrow 1, the subscriber obtains a local cellular phone number by inserting into the wireless device 120 a SIM card 127 that is associated with a service provider in Japan. The least-cost routing agent 125 of the device detects the change in number and foreign carrier network ID and, as represented by arrow 2, registers with the APAC VoIP gateway 111 to obtain VoIP service in that region (via the WLAN 131). Additionally, as represented by arrow 3, the agent 125 registers the new number and the device's home number with the common SIP registrar 140. An optimized routing rules database is maintained by the common SIP registrar 140 to facilitate sharing optimal least-cost routes with the LCR agents of mobile devices.

As represented by arrow 4, the SIP registrar 140 interacts with the APAC VoIP gateway 111 to acknowledge the presence of the device in Japan (or that the device is to be served by the APAC VoIP gateway 111). In addition, as represented by arrow 5, the SIP registrar 140 informs the home VoIP gateway 114 in the North American region of the location of the device 120 (or that the APAC VoIP gateway 111 is now serving the device) and of its new cellular service phone number (if any) in Japan.

As mentioned above, the device 120 need not obtain cellular service in Japan, in which case there would be no new SIM card inserted in the device. The LCR agent 125 can detect or be informed of the change in location of the device by several different mechanisms, including, for example, via the use of GPS, by user input, by detecting the cellular network ID or a change in IPv4 or IPv6 network address, or by detecting the presence of the enterprise WLAN 131 in the new location. The LCR agent 125 would then register the device's new location and home phone number with the common registrar 140.

As represented by double-headed arrow 6, VoIP calls to and from the device 120 while in Japan (and connected to WLAN 131) are routed via the VoIP gateway 111. Employing SIP routing, an inbound call to the device's home number in the United States is routed by the VoIP gateway 114 to the VoIP gateway 111, and on to the device 120. In Japan, if the device is connected to the WLAN 131, the inbound call preferably will be routed to the device via the WLAN 131. If, however, the device is not connected to the WLAN 131 and the device has local cellular service in Japan, the VoIP gateway 111 can forward the inbound call via the public cellular network 151 to the device by placing a local call to the device's local cellular telephone number.

When an outbound call is to be originated by the wireless device 120, the LCR agent 125 determines which medium to use in accordance with the rules engine described above. For example, where the destination is within the enterprise, the VoIP infrastructure is preferably used to route the call as it would provide the lowest cost route. Where the destination is outside of the enterprise but local to the current location of the device (Japan), the LCR agent 125 may choose to place the call as a cellular call using the public cellular network (151). Where the outbound call is to a destination outside of the region that the device is currently in, the LCR agent 125 will preferably select the VoIP infrastructure to handle the call, in which case the local VoIP gateway 111 will redirect the call to the home VoIP gateway 114, from where it is routed as though the call originated from the home network. In the alternative, the local VoIP gateway 111 can redirect the call to the VoIP gateway (112-114) in the region, or closest to the region of the destination's location, or the VoIP gateway through which the call can be completed at the lowest cost.

Figure 3:
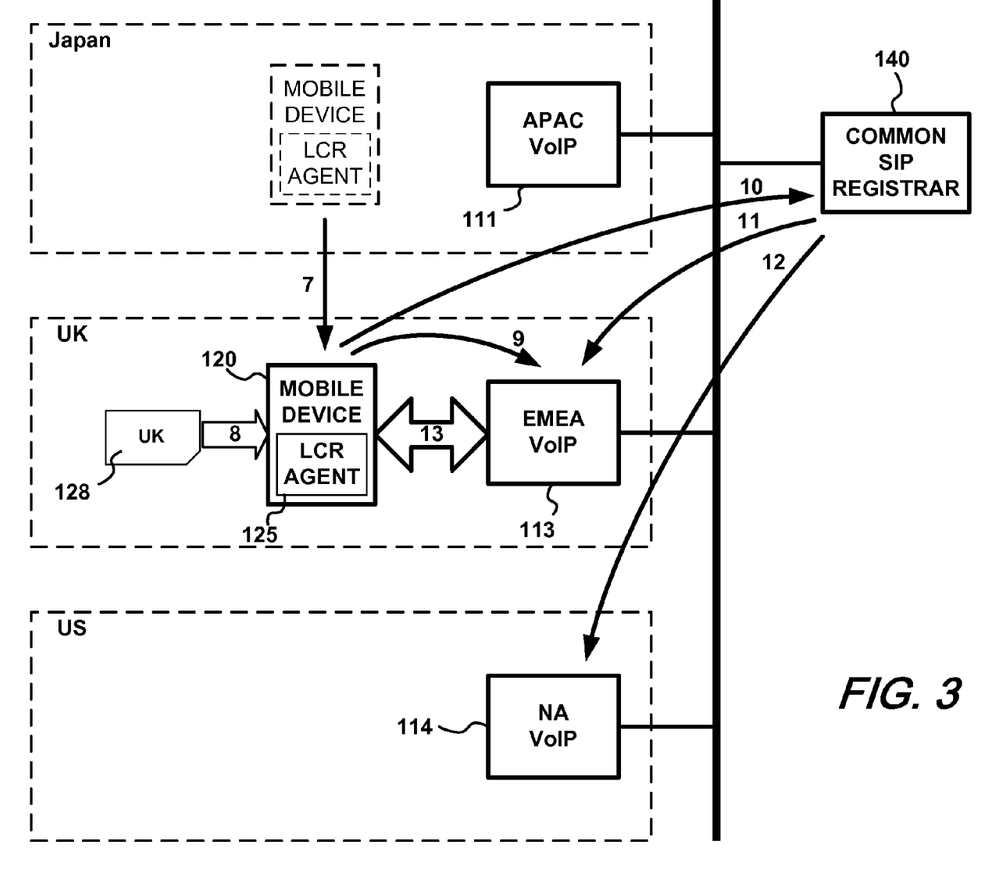
FIG. 3 is a high-level diagram illustrating the operation of the exemplary embodiment of the present invention when the device roams from the first foreign network into a second foreign network.

FIG. 3 shows a further illustrative scenario in accordance with an exemplary method of the present invention. In the scenario of FIG. 3, the wireless device 120 roams (arrow 7) from one foreign region (APAC) to another foreign region (EMEA). For purposes of illustration, the home country of the device 120 is the United States, as above, and it arrives in the United Kingdom from Japan. The subscriber again swaps the device's current cellular phone number for a local UK number, as represented by arrow 8. This can be done by obtaining a SIM card 128 associated with a cellular service provider operating in the UK. The least-cost routing agent 125 detects the change in number and, as represented by arrow 9, registers with the EMEA VoIP gateway 113 to obtain VoIP service in that region (via the WLAN 133). Additionally, as represented by arrow 10, the LCR agent 125 registers the new (UK) cellular number and the device's home number with the common SIP registrar 140.

As represented by arrow 11, the SIP registrar 140 interacts with the EMEA region VoIP gateway 113 to acknowledge the presence of the device in the UK (or in the service area of the VoIP gateway 113). In addition, as represented by arrow 12, the SIP registrar 140 informs the home VoIP gateway 114 of the current location of the device (or that the device is now being served by the EMEA VoIP gateway 113) and of the device's new phone number.

As represented by double-headed arrow 13, VoIP calls to and from the device 120 while in the UK (and connected to WLAN 133) are routed via the EMEA VoIP gateway 113. Employing SIP routing, an inbound call to the device's home number in the United States is routed by the VoIP gateway 114 to the VoIP gateway 113, and on to the device 120. In the UK, if the device is connected to the WLAN 133, the inbound call preferably will be routed to the device via the WLAN 133. If, however, the device is not connected to the WLAN 133 and the device has local cellular service in the UK, the EMEA VoIP gateway 113 can forward the inbound call via the public cellular network 153 to the device by placing a local call to the device's local cellular telephone number. Outbound calls from the device 120 are handled as described above in connection with the scenario of FIG. 2.

Figure 4:
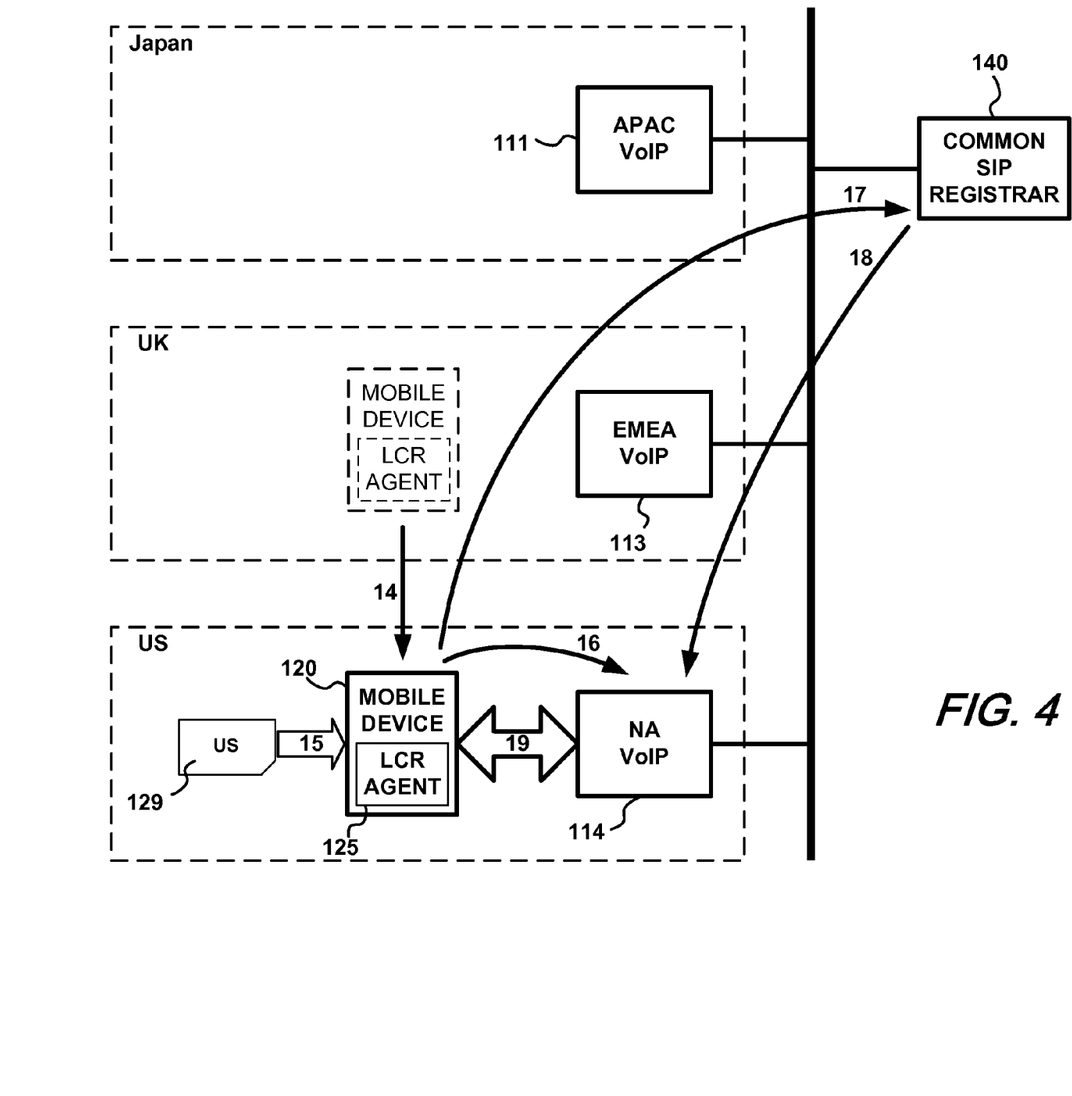
FIG. 4 is a high-level diagram illustrating the operation of the exemplary embodiment of the present invention when the device returns to its home network.

FIG. 4 shows a further illustrative scenario in accordance with an exemplary method of the present invention. As represented by arrow 14, the wireless device 120 returns to its home network in the US. The subscriber configures the device (arrow 15) to use the originally assigned number that is local to the home network. The LCR agent 125 detects the change in number and obtains VoIP service via the NA VoIP gateway 114 (arrow 16) and registers (arrow 17) the home number with the common SIP registrar 140. As represented by arrow 18, the SIP registrar 140 also informs the NA VoIP gateway 114 that the device 120 is back in the home network and no re-routing of calls is necessary. As represented by double-headed arrow 19, VoIP calls to and from the device 120 are handled via the NA VoIP gateway 114. Any inbound calls would be routed in the normal manner and any outbound calls can be routed using the VoIP infrastructure or as a direct call using the service provider's network in the home area, as described above.

Another aspect of the present invention relates to displaying to recipients of outbound calls from a mobile device, the 'well-known' home network phone number of the device, even when the device has obtained a local number in a foreign network. Doing so essentially hides the fact that a roaming wireless device is using a temporary local phone number in a foreign network. In an exemplary embodiment of the present invention, an outbound call from the mobile device 120 that is originated as a VoIP call will be handled by the VoIP gateway (111-114) serving the region in which the device 120 is located, and/or by the VoIP gateway serving the device's home region. When the VoIP gateway bridges the call to the intended destination, it can generate caller ID signaling indicating the familiar home number associated with the device 120. As a result, the home number of the device 120 is presented as the caller phone number independent of the current location of the device and any local number it may be using. This feature is preferably user-configurable as there may be situations where the user does want to expose the roaming network (caller-ID) identity for the intended called party and disable or hide the home network identity.

By avoiding the use of roaming services in the service providers' networks, substantial cost savings can be achieved with the above-described implementation of the present invention. Local calls can still be made using a local phone number and the service providers' networks. As international calls are routed via the Internet using VoIP, roaming charges can be avoided.

It is understood that the above-described embodiments are illustrative of only a few of the possible specific embodiments which can represent applications of the present invention. Numerous and varied other arrangements can be made by those skilled in the art without departing from the spirit and scope of the invention.

What is claimed is:

1. A method for providing least-cost routing of calls for a roaming mobile wireless device having a home phone number associated therewith, the method comprising:

obtaining local wireless service for the mobile wireless device, including associating a local phone number with the mobile wireless device;

detecting the association of the local phone number with the mobile wireless device using an agent on the mobile wireless device;

establishing a wireless connection between the mobile wireless device and an enterprise network;

registering the mobile wireless device with a common registrar coupled to the enterprise network, including providing an indication of a current location of the mobile wireless device;

sending an acknowledgement from the common registrar to a local voice over internet protocol (VoIP) gateway coupled to the enterprise network;

sending information from the common registrar to a home VoIP gateway coupled to the enterprise network, the information including the indication of the current location of the mobile wireless device;

routing an inbound call to the home number associated with the mobile wireless device from the home VoIP gateway to the local VoIP gateway;

originating an outbound call from the mobile wireless device;

selecting, using the agent, the enterprise network for handling the outbound call, wherein the agent chooses a least cost route for the outbound call in accordance with routing rules for where the mobile wireless device is currently attached;

providing the outbound call from the mobile wireless device to the local VoIP gateway;

routing the outbound call from the local VoIP gateway to the home VoIP gateway; and forwarding the outbound call from the home VoIP gateway to a destination of the outbound call.

2. The method of claim 1, comprising providing the inbound call as a VoIP call to the mobile wireless device via the wireless connection.

3. The method of claim 1, comprising routing the inbound call to the local phone number.

4. The method of claim 1, wherein the wireless connection between the mobile wireless device and the enterprise network is established using settings sent to the mobile wireless device from a device management server.

5. The method of claim 4, wherein the device management server and the mobile wireless device are mutually authenticated.

6. The method of claim 1, wherein the agent is installed and configured on the mobile wireless device by a device management server.

7. The method of claim 6, wherein the device management server and the mobile wireless device are mutually authenticated.

8. The method of claim 1, wherein the wireless connection is established over a wireless local area network (WLAN).

9. The method of claim 1, wherein the common registrar comprises a session initiation protocol (SIP) registrar.

10. The method of claim 1, wherein the acknowledgement contains an indication of the presence of the mobile wireless device and its home location.

11. The method of claim 1, wherein the common registrar maintains an optimized routing rules database.

12. The method of claim 1, wherein the agent detects a change in location of the mobile wireless device and initiates the step of registering the mobile wireless device with the common registrar.

13. The method of claim 1, wherein the mobile wireless device has at least two wireless connection modes including a cellular mode and a wireless local area network (WLAN) mode.

14. The method of claim 1, wherein the agent detects the association of the local phone number with the mobile wireless device by detecting the insertion in the mobile wireless device of a Subscriber Identity Module (SIM) associated with the local phone number.

15. The method of claim 1, wherein the home phone number associated with the mobile wireless device is provided as a caller phone number to the destination of the outbound call.

* * * * *